United States Patent [19]

Cheng et al.

[11] Patent Number: 4,768,482

[45] Date of Patent: Sep. 6, 1988

[54] AUTOMATIC CONTROL AND FUEL SAVING MEANS FOR INTERNAL COMBUSTION ENGINES

[76] Inventors: Ansheng Cheng, No. 6, Unit 1, Building 11, Nan Shaomen, Xian; Lifeng Lu, No. 130, Mei Long Road, Shanghai; Jinghuan Chen, No. 1, Ren Min Road, De Lin Ha, Haixi Zhou, Qinghai; Bin Xu, No. 70, Beijingxi Road, Nanjing, Jinagsu, all of China

[21] Appl. No.: 937,295

[22] Filed: Dec. 3, 1986

[30] Foreign Application Priority Data

Dec. 5, 1985 [CN] China ................................. 85108935

[51] Int. Cl.$^4$ .............................................. F22B 37/22
[52] U.S. Cl. ...................................... 123/363; 123/377
[58] Field of Search ................................. 123/363, 377

[56] References Cited

U.S. PATENT DOCUMENTS 3,400,697 9/1968 Cupit et al. ......................... 123/363
3,916,854 11/1975 Barton et al. ....................... 123/363

FOREIGN PATENT DOCUMENTS

54-59726 5/1979 Japan.

Primary Examiner—Allen M. Ostrager
Attorney, Agent, or Firm—Pennie & Edmonds

[57] ABSTRACT

Automatic control and fuel saving means for internal combustion engines, comprising: at least one centrifugal speed sensor having at least one pair of flyweights, which flyweights are disposed in the guide tracks on a holder, the said guide tracks are such orientated that the components of the centrifugal forces of the flyweights in the guide track directions substantially match the elastic forces of the spring exerting on the flyweights; a mode shifting device connected to the said speed sensor and to the manual operating mechanisms, the said mode shifting device alternately puts the engine into the automatic control mode by the said speed sensor or into the manual control mode.

12 Claims, 5 Drawing Sheets

AUTOMATIC CONTROL AND FUEL SAVING MEANS FOR INTERNAL COMBUSTION ENGINES

The present invention relates to automatic control and fuel saving means for internal combustion engines, particularly for engines used on vehicles.

BACKGROUND OF INVENTION

For years it has been the main subjects in the area of automobiles, i.e. to simplify the driving operations and to reduce the fuel consumption. Various solutions have been suggested such as automatic vehicles, semi-automatic vehicles, speed governers, manual throtle valve locking devices, and so on. But all these solutions have shortcomings. Automatic vehicles are expensive and require strict working conditions. Semi-automatic vehicles have complex structures and still require manual operation. Conventional centrifugal governers have serious problems in balancing centrifugal forces, which vary according to squared rotation speeds, with elastic forces of the governer springs which are linear functions of the displacement. Therefore, their applications are generally limited to the idling and/or maximum speed governing. Centrifugal governers could be adapted to full range operations by frequent manual adjustment of the governer springs so as to approximate their elastic forces to the centrifugal forces in each small sub-ranges. However, the control precision is not good. Manual throtle valve locking devices can reduce drivers' labor to some extent by keeping the pedal in proper positions during normal running, but they cannot change the fuel supply in response to the changes of engine loads, nor can they deal with emergencies.

Therefore, the main object of the present invention is to provide internal combustion engines with automatic control and fuel saving means, which can automatically and rationally control the fuel supply according to the real load of engines, which can be switched freely and easily between manual and automatic control modes during operation, which can improve the engine operation and lengthen their service time, and which have simple structure and high reliability.

It is a further object of the present invention to provide internal combustion engines on vehicles with automatic control and fuel saving means, which can automatically and reliably control the fuel supply and gear shifts according to real loads of the engine during normal operations, and which can save drivers' labour.

SUMMARY OF THE INVENTION

According to the present invention, the automatic control and fuel saving means for internal combustion engines cmprises:

at least one centrifugal speed sensor, wherein the flyweights are disposed in the guide tracks on a holder and are movable therealong, said guide tracks being so arranged that the components of the centrifugal forces of the flyweights in the track directions substantially match the elastic forces of the springs exerting on the flyweights;

a mode shifting device which is connected to the speed sensor and to a manual operating means and switches the engine fuel supply system between the automatic control mode and the manual control mode through the speed sensor.

The automatic control and fuel saving means further comprises cam-rod mechanisms which are driven by the said speed sensors to shift gears automatically during normal operations.

In principle, the said speed sensors in the automatic control and fuel saving means of the present invention are of the type of centrifugal governors, wherein each flyweight is disposed in a guide track and is connected to a slidable rotor via wires. During the operation, the flyweight is moved along the guide track by the centrifugal force F. The force F has a component $F_1$ in the track direction. The force $F_1$ exerts on the slidable rotor via the wires against a force $F_2$ (the resultant of the biasing forces of the governer springs and axial moving resistances of the slidable rotor). Since the $F_1$ varies according to the relation $F_1 = F \cos \theta$ ($\theta$ is the angle between the directions of the centrifugal force F and the guide track) when the flyweight moves along the track under the force F, it is possible to keep the $F_1$ relatively small no matter how big the F is. Thus the force $F_1$ can be balanced in almost entire speed ranges by the elastic force of a single spring without exceeding its elastic deformation limit, provided that the guide track is properly designed. Therefore the precise sensing of the load variations and the feed-back control of the engine can be obtained through the displacement of the slidable rotor in the entire speed range of the engine.

DETAILED DESCRIPTION OF THE EMBODIMENT

Figure 1:
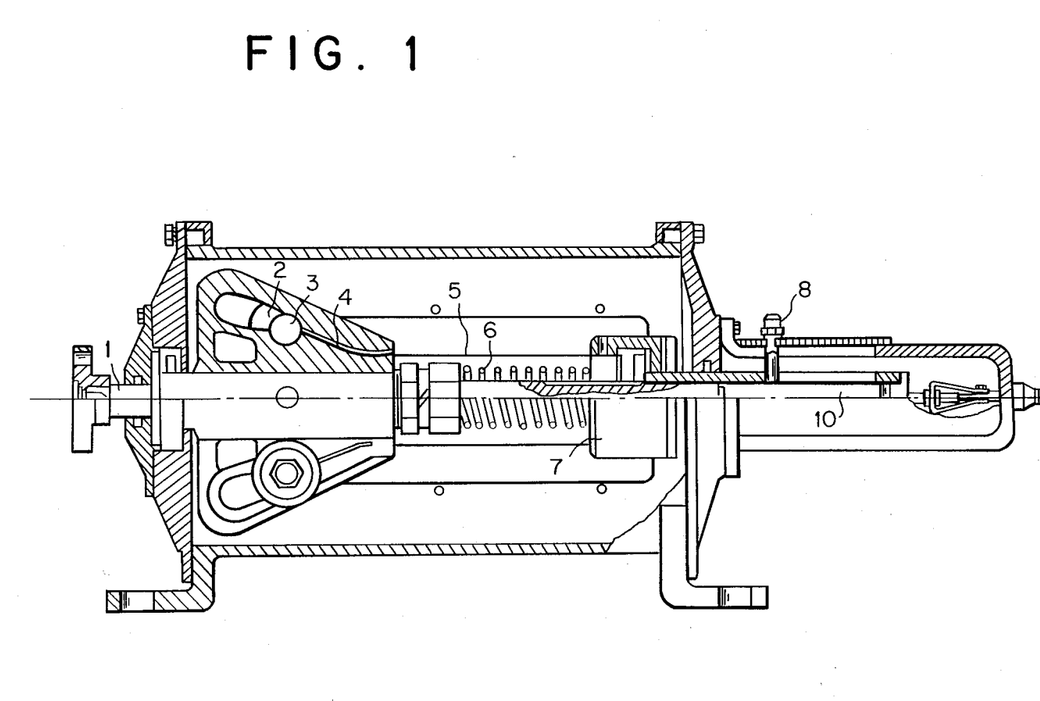
FIG. 1 is a partial section view of the speed sensor in the automatic control and fuel saving means according to the present invention.

Referring now to the FIG. 1. In the automatic control and fuel saving means, a speed sensor comprises: a speed sensing axle 1; a flyweight holder being fixed on the front end of the axle 1 and having a pair of guide tracks 3 extending thereon. Said guide tracks 3 are symmetrically arranged in relation to the axle. The curve of the guide track 3 is defined by an equation to be discussed later. A pair of flyweights 2 are movably disposed in the guide tracks 3. A curved channel 4 extends from the rear end of each guide track 3 to the rear end of the holder. Wires 5 extend through each channel 4 to connect the flyweights 2 with a rotor 7 axially slidably mounted on the axle 1. A precompassed main spring 6 is disposed between the flyweight holder and the rotor 7 against the assembly of the flyweights 2 and the rotor 7 toward the rear end of the axle. A sleeve protrudes from the rear end of the rotor 7 and is axially fixed but peripherally movable with respect to the rotor 7. A connecting cord or rod 10 is fixed on the rear end of the sleeve and transmits the displacement of the flyweight-rotor assembly to the fuel supply system or gear shifting mechanism for feedback control. A bolt 8 limits and adjusts the axial movement range of the flyweight-rotor assembly.

Figure 2:
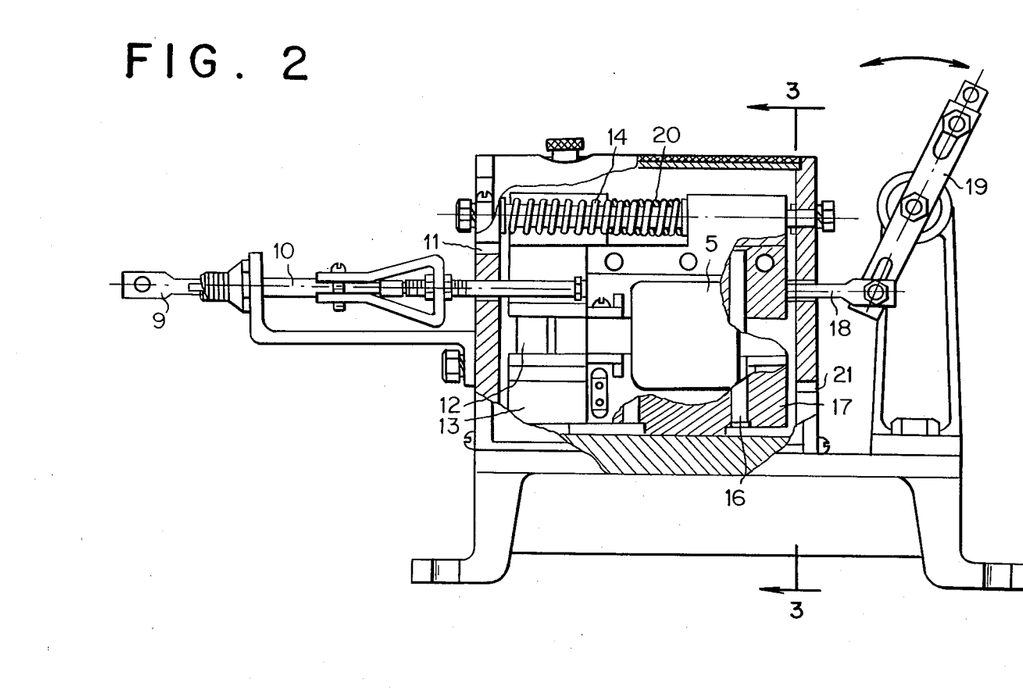
FIG. 2 is a partial section view of the mode shifting device in the automatic control and fuel saving means.
Figure 3:
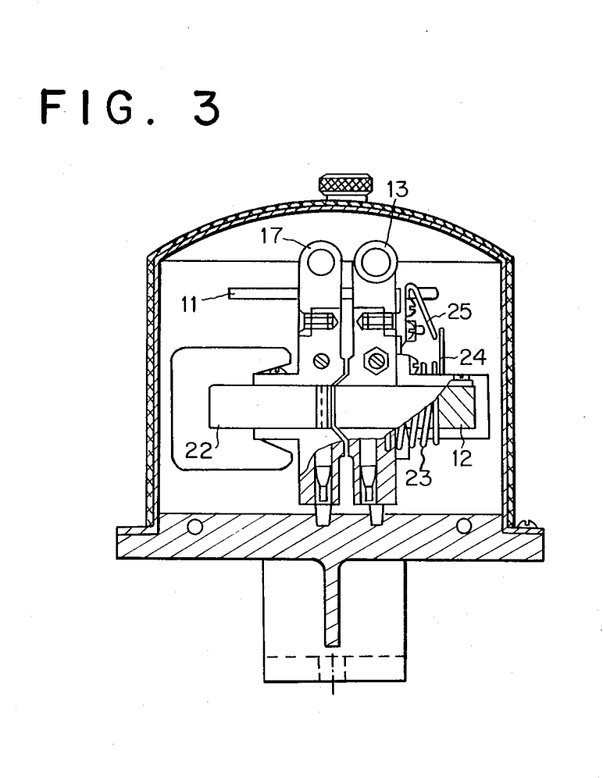
FIG. 3 is a section view taken along the A—A direction in the FIG. 2.

The FIG. 2 and FIG. 3 show a mode shifting device in the automatic control and fuel saving means according to the present invention. The mode shifting device comprises a first slider 17 and a second slider 13. Said two sliders are laterally spaced and parallelly disposed with each other, and are movable either independently or synchronously between a first end and a second end of a housing of the mode shifting device. The said first slider 17 is connected to the flyweight-rotor assembly via the connecting cord or rod 10 and the sleeve. The second slider 13 is connected to a pedal through a rod 9 and to a throttle valve (or the rack in a fuel pump for a diesel engine) via a rod-lever mechanism 18. An electromagnet 15 and an iron bar 12 are mounted on the first and the second sliders 17, 13, respectively. The first and the second sliders 17, 13 move independently when the electromagnet is electrically disconnected i.e. the current is off. When the current is on, the iron bar 12 on the slider 13 is attracted by the electromagnet 15 on the slider 17; thus the two sliders are substantially laterally aligned and electromagnetically locked to move together. A first spring 14 biases the first slider 17 against the second end of the device housing for keeping the throttle valve full open; while a second spring 20 intends to bias the second slider 13 against the first end of the device housing for keeping the throttle valve full close. The precompressions of the two springs 14, 20 are adjusted different so as to ensure that when the two sliders 13, 17 are locked together the second slider 13 will follow the first slider 17 to move toward the second end of the device housing for making the throttle valve full open in the case that no outer forces exert, or will follow the outer forces to place the throttle valve in proper conditions.

Rollers 16 are provided between the contacting surfaces of the iron bar 12 and the sliders 13, 17 to reduce the moving resistances therebetween. A spring 23 pushes the iron bar 12 apart from the electromagnet 15 to unlock the two sliders 13, 17 when the electricity is off. A switch means 24, 25 can be attached to the sliders to turn on a bulb when the two sliders are locked, indicating the start of the automatic control mode. The vents 11, 21 are provided on the wall of the device housing for cooling the electro-magnet 15.

A manual adjusting means can be attached for adjusting the precompressions of the main spring 6 and the springs 14, 20 during the operation of the automatic control and fuel saving means. For example, a fork and lever mechanism can be attached at the front end of the main spring 6 in the speed sensor.

A hydraulic or a pneumatic cylinder or a mechanical pusher can be provided for overcoming the biasing force of the spring 14 and pushing the first slider 17 out of the said second end position in the said device housing to meet the second slider 13 and engage therewith when the electricity is on, so as to speed up the mode shift.

Referring back to the speed sensor shown in the FIG. 1. the axis of the guide track 3 coincides with the theoretical path of the relative movement of the flyweight center, and the curve is determined by the equation:

$$m\pi^2 n^2 \cos\theta [r_o + (L+R)\cos\theta] \cdot (1 - \mu_1 \mathrm{tg}\theta - 2\mu_2 \cos\beta) - 900(f_o + \alpha L) = 0$$

In the equation:
m—flyweight mass;
n—rotation speed of the sensing axle 1,
$r_o$—revolving radius of the flyweight center at the adjecent preceding point, and at the initial point it equals to the distance from the front end of the channel 4 to the axis of the axle 1;
L—compressed distance increment of the main spring 6 (approximately equal to the throtle valve closed increment);
R—flyweight axle radius (used only at the initial point and eliminated in the all other points along the curve);
$\mu_1$—resistance coefficient between the flyweight 2 and the guide track 3;
$\mu_2$—resistance coefficient between the channel 4 and the wire 5;
$\beta$—angle between the directions of a radius line passing through the middle point of the curved channel 4 and a tangent line at the end point of the channel 4;

$$\alpha = \alpha_1 + \alpha_2 + \alpha_3$$

wherein:
$\alpha_1$—rigidity of the main spring 6,
$\alpha_2$—rigidity of the first spring 14,
$\alpha_3$—rigidity of the second spring 20;

$$f = f_3 + f_4 + f_5$$

wherein:
$f_3$—resultant of the precompressions of the springs,
$f_4$—resultant of the moving resistances of the sliders and the throtle valve;
$f_5$—resultant of the friction resistances between the rotor assembly and the axle 1, and between the axle 1 and the bearings.

The parameters in the equation listed above can be determined by a trial and error method, in accordance with the specific demand for vehicle control, and with the considerations of the factors such as the moving resistances of the holder, the materials, and the sizes of the parts.

The general procedure is: establishing the specific demand for vehicle control; choosing a set of m, n, $r_o$ and other parameters so as to calculate the values of $\theta$ with them point by point, said series of points defining the guide track curve; changing one or more of the parameters in the preceeding set and repeating the above steps until obtaining a rational guide track curve.

In the following Table 1 to Table 3, a result of a real design is demonstrated. And it is obvious that with the variations of the vehicle control demands and parameter choices, the results of the calculations can be quite different.

TABLE 1

| Main Demands for Vehicle Control | | | | | | | | |
|---|---|---|---|---|---|---|---|---|
| Vehicle running speed V (Km/h) | 40 | 45 | 50 | 55 | 60 | 65 | 70 | 75 |
| Throtle valve close displacement $\Sigma L$ (mm) | 0 | 3.1 | 6.1 | 9.2 | 12.3 | 19.8 | 27.4 | 35 |
| Throtle valve open percentage % | 100 | 91 | 82 | 74 | 65 | 43 | 22 | 0 |

In the table 2, $P_1$, $P_2$, $P_3$ stand for precompressions of the main spring, the first spring and the second spring, respectively.

TABLE 2

| | | | | Design Parameters | | | | | |
|---|---|---|---|---|---|---|---|---|---|
| m (Kg) | $r_o$ (m) | R (mm) | β | $\mu_1$ | $\mu_2$ | $f_4$ (N) | $f_5$ (N) | initial θ | magnetic potential |
| 0.465 | 0.03658 | 10 | 76° | 0.18 | 0.18 | 0.98 | 2.45 | 75.3° | 3150 (AN) |
| | α(N/mm) | | | $f_3$ (N) | | | I = V(Km/h):n(rpm) | | |
| $α_1$ | $α_2$ | $α_3$ | $p_1$ | $p_2$ | $p_3$ | I = 1:20 | | | |
| 2.94 | 0.98 | 0.98 | 0.98 | 51.94 | 49.0 | | | | |

TABLE 3

| | θ- L | | | | | | | |
|---|---|---|---|---|---|---|---|---|
| V (Km/H) | 40 | 45 | 50 | 55 | 60 | 65 | 70 | 75 |
| n (r. p. m) | 800 | 900 | 1000 | 1100 | 1200 | 1300 | 1400 | 1500 |
| L (mm) | 0 | 3.0625 | 9.1875 | 6.125 | 12.25 | 19.8 | 27.42 | 35 |
| θ(°) | 75.3 | 70.67 | 68.18 | 66.90 | 66.33 | 63.96 | 62.43 | 61.97 |
| m (Kg) | 0.4650 | 0.4649 | 0.4646 | 0.4649 | 0.4648 | 0.4649 | 0.4657 | 0.4649 |
| r (mm) | 40.00 | 40.40 | 42.57 | 44.11 | 45.51 | 49.79 | 53.90 | 57.53 |

Figure 4:
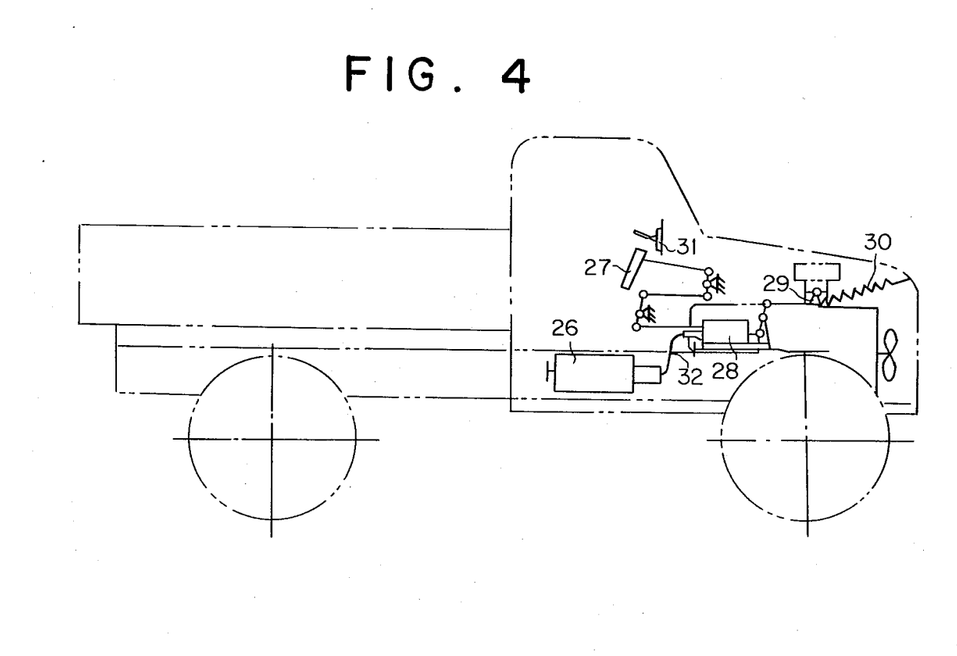
FIG. 4 is a schematic view showing the arrangement of the first embodiment of the automatic control and fuel saving means in a vehicle.

The FIG. 4 shows the arrangement of the first embodiment of the automatic control and fuel saving means according to the present invention in a vehicle, wherein a speed sensor 26 is connected to a mode shifting device 28 through a connecting cord 32. The said mode shifting device 28 in turn connects a pedal 27 and a throttle valve 29 by means of lever-rod mechanisms respectively. The original throtle valve spring 30 of the conventional fuel supply system should be removed. The speed sensor 26 is driven by the power derived from the worm gear of the speedometer.

In the manual control mode, when the electro-magnet 15 is inactive, the throttle valve 29 is governed by the driver through the pedal 27 and the second slider 13. To change the mode, the only thing the driver has to do is to turn on the switch 13 in the electro-magent circuit, while at the same time urging the first slider 17 to meet the second slider 13 by means of a mechanical, or hydraulic or pneumatic mechanism, so as to put the two sliders into electro-magnetically locked condition. Thus, the manual control mode is shifted into the automatic control mode, which is indicated by a bulb on the instrument panel. And the mode will be shifted back when the driver disconnects the circuit by turning off the switch 31, causing the separation of the electromagnet 15 from the iron bar 12. In the automatic control mode, the driver's foot is generally free from the pedal 27 except occasionally treadling to impose a instant accellaration, thus the foot is more ready to the brake pedal in the case of emergencies. To slow down or stop the vehicle immediately, just treadle down the clutch and brake pedal. Higher speed range is obtainable by adjusting the axial displacement range of the rotor 7 or the precompression of the main spring 6 in the speed sensor 26.

The second embodiment of the automatic control and fuel saving means according to the present invention comprises three speed sensors and a mode shifting device of the types described above, and a cam-rod mechanism. The said cam-rod mechanism is used to control the conventional hydro-mechanical transmission.

Of the three speed sensors, a first speed sensor detects the vehicle running speed, and cooperates with the said mode shiffing device to control the fuel supply system as previously described.

Figure 5:
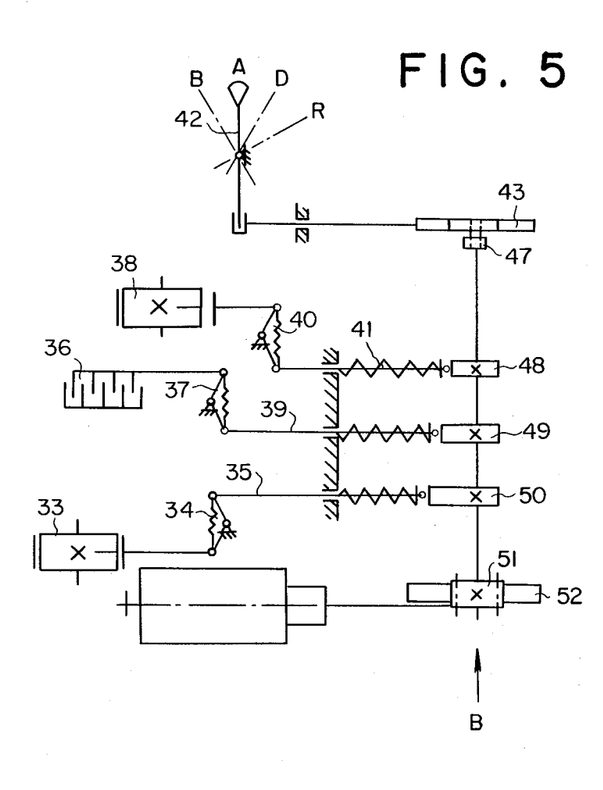
FIG. 5 is a schematic view showing the arrangement of the second embodiment of the automatic control and fuel saving means according to the present invention.
Figure 6:
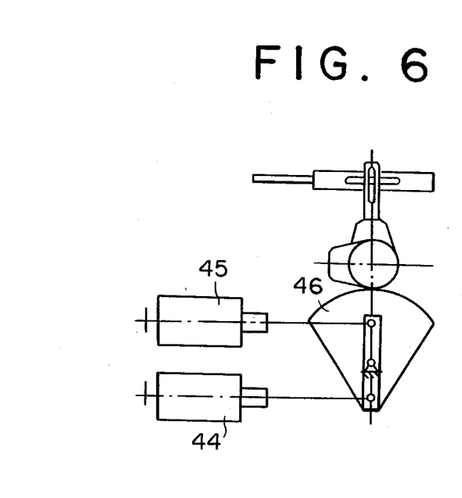
FIG. 6 is a fragmentary schematic view in the direction B of the FIG. 5.

The second and the third speed sensors 44, 45 and the cam-rod mechanism are arranged as shown in the FIG. 5, FIG. 6, wherein the two speed sensors 44, 45 detect the vehicle and the engine speed respectively. In response to the variations of the said speeds, the speed sensors 44, 45 drive the camshaft via a pivotally supported lever 46 and a pair of gears 51, 52, causing the camshaft to rotate reciprocally in a range of certain angles. The camshaft has three cams 48, 49, 50 therealong in different working angles. Said three cams 48, 49, 50 respectively abut against the path rods 35, 39, 41. When the vehicle is running, the camshaft rotates reciprocally according to the variations of the driving forces of the speed sensors 44, 45 which correspond to the variations of the vehicle and engine speeds, and puts the cams 48, 49, 50 into or out of their operable angles, so as to grip or release gear clutches by means of the push rods.

The push rods 35, 39, 41 are provided with stabilizing springs 34, 37, 40, respectively. Said stabilizing springs 34, 37, 40 prevent the gear clutches from being influenced by undesired fluctuations, and ensure the immediate grip or release of the clutches when passing the central dead points.

A handle 42, a slot 43 and a rocker lever 47 are provided to regulate the rotation range of the camshaft. When the handle 42 is in the position A, only the cam 50 is in its rotation range, and the low speed gear clutch is engaged. With the handle 42 in the position B, the camshaft can rotate between the working angle of the cam 50 and the working angle of the cam 49, so that the low speed gear clutch and the direct drive clutch may be engaged and released alternately in response to the changes of the vehicle speed. With the handle 42 in the position O, all the cams are out of their working angles, so that the low gear clutch 33, the reverse gear clutch 38, and the direct drive clutch 36 are all released. With the handle 42 in the position R, the cam 48 enters its working angle and grips the reverse gear clutch 38 by means of the push rod 41.

It can be clearly seen from the above descriptions that the automatic control and fuel saving means according to the present invention can automatically control the fuel supply and gear shifts in a simple and reliable way, and ensure the rational and economical operation of the vehicles.

And it is to be understood that the present invention is not limited to the embodiments described hereabove, various changes and modifications can be made by those skilled in the art without departing from the scope of the following claims.

What is claimed is:

1. An automatic control and fuel saving means for internal combustion engines comprising:

at least one centrifugal speed sensor comprising at least one pair of flyweights which are disposed for motion along guide tracks in response to centrifugal force thereon during rotation of said sensor, and at least one preloaded spring, said guide tracks being so arranged that the component of the centrifugal force on each of the flyweights along the guide track is substantially equal and opposed to an elastic force exerted by said at least one spring on the flyweight; and a mode shifting device connecting with said speed sensor and a manual operating mechanism, said mode shifting device alternatively switching the engine control mode to auto or to manual responsive to either of said speed sensor or said manual operating mechanism.

2. The automatic control and fuel saving means according to claim 1, wherein said speed sensor comprises a speed sensing-axle for detecting the rotation speed of the engine or of an associated vehicle, a holder fixed on the speed sensing axle and having said at least one pair of guide tracks extending symmetrically therefrom; and a rotor mounted on said axle and connected with the flyweights through connecting means.

3. The automatic control and fuel saving means for internal combustion engines according to claim 2, wherein the curve of said guide track is defined by the equation:

$$m\pi^2 n^2 \cos\theta[r_o+(L+R)\cos\theta]\cdot(1-\mu_1\tan\theta-2\mu_2\cos\beta)-900(f_o+\alpha L)=0$$

in which $\theta$ is the angle between the direction of the centrifugal force and the guide track.

4. The automatic control and fuel saving means for internal combustion engines according to claim 1, wherein said mode shifting device has a first slider being connected to said flyweight and being biased toward one end of the device housing by a first spring and a second slider being connected to the manual operating mechanism and biased against the other end of the device housing.

5. The automatic control and fuel saving means according to claim 4, wherein said first slider and said second slider are laterally spaced and parallelly disposed in the housing.

6. The automatic control and fuel saving means according to claim 4, wherein said two sliders are movable between the two ends of the housing either independently or synchronously.

7. The automatic control and fuel saving means according to claim 5, wherein the second slider is controlled by said manual operating mechanism when said two sliders are separated and is controlled by said first slider when the two sliders are electromagnetically locked.

8. The automatic control and fuel saving means according to claim 4, wherein said second slider is connected as a fuel supply device, whereby the fuel supply is able to be adjusted to the minimum amount when said second slider is at the other end of the housing and to the maximum amount when said second slider is at said one end of the housing.

9. The automatic control and fuel saving means according to claim 4, wherein a hydraulic or a pneumatic means is provided for pushing said first slider away from said one end of the housing against the force of said spring so as to have said two sliders locked fast.

10. The automatic control and fuel saving means according to claim 4, wherein the preloading and degree of bias exerted by said at least one spring on the flyweight assembly and sliders are adjustable by means of a manual lever fork mechanism during operation.

11. In combination, three centrifugal speed sensors as recited in either or claims 1 or 2, arranged as an automatic fuel saving system for internal combustion engines used in vehicles, wherein the first and the second sensors detect the running speed of the vehicle, and the third sensor detects the engine speed; and said system further comprising a mode shifting device connected to said first speed sensor for adjusting the fuel supply of the engine; and a camshaft having a plurality of cams disposed in different working angles thereon, said camshaft being driven by said second and third speed sensors to rotate in reciprocating fashion in response to the speed variations of the engine and the vehicle, whereby the cams are operated to switch gears of the transmission said transmission also being operable by a manual regulating means.

12. The automatic control and fuel saving means according to claim 11, wherein the second and the third speed sensor connect to same gear and apply two torques in opposite direction, said gear engaging with a gear fixed on said camshaft.

* * * * *

UNITED STATES PATENT AND TRADEMARK OFFICE
CERTIFICATE OF CORRECTION

PATENT NO. : 4,768,482

DATED : Sept. 6, 1988

INVENTOR(S) : Ansheng Cheng, Lifeng Lu, Jinghuan Chen, Bin Xu

It is certified that error appears in the above-identified patent and that said Letters Patent is hereby corrected as shown below:

In column 5, line 34 change "switch 13" to --switch 31--.

In column 6, line 25 change "path rods" to --push rods--.

Signed and Sealed this

Fourteenth Day of March, 1989

Attest:

DONALD J. QUIGG

*Attesting Officer*  *Commissioner of Patents and Trademarks*